United States Patent [19]

Blankenhagen et al.

[11] Patent Number: 5,324,592

[45] Date of Patent: Jun. 28, 1994

[54] FRICTION MATERIAL CONTAINING BRASS POWDERS

[75] Inventors: Fred Blankenhagen, Penzberg; Hermann Pütz, Schongau, both of Fed. Rep. of Germany

[73] Assignee: Hoerbiger & Co., Schongau, Fed. Rep. of Germany

[21] Appl. No.: 854,885

[22] Filed: Mar. 20, 1992

[30] Foreign Application Priority Data

Mar. 20, 1991 [AT] Austria ......................... 624/91

[51] Int. Cl.$^5$ ............................................. B22F 5/00
[52] U.S. Cl. ................................. 428/552; 428/548; 428/551; 428/553; 428/564; 428/565; 75/245; 75/246; 75/247
[58] Field of Search ............... 428/546, 548, 551, 552, 428/553, 564, 565; 75/228, 245, 246, 247

[56] References Cited

U.S. PATENT DOCUMENTS

| | | | |
|---|---|---|---|
| 2,072,070 | 2/1937 | Fisher | 75/22 |
| 3,014,884 | 12/1961 | Bray | 260/38 |
| 3,660,120 | 5/1972 | Clark et al. | 106/36 |
| 4,273,699 | 6/1981 | Chester | 260/38 |
| 4,310,452 | 1/1982 | Chester | 260/38 |
| 4,374,211 | 2/1983 | Gallagher et al. | 523/156 |
| 4,656,203 | 4/1987 | Parker | 523/155 |
| 4,944,373 | 7/1990 | Ohya et al. | 188/251 A |
| 5,041,471 | 8/1991 | Brinzey | 523/153 |

OTHER PUBLICATIONS

Rose, Arthur and Elizabeth, *The Condensed Chemical Dictionary*, 7th Ed., Van Nostrand Reinhold Co., 1969 (© 1966), pp. 133–134.

*Primary Examiner*—Donald P. Walsh
*Assistant Examiner*—Christian D. Carroll
*Attorney, Agent, or Firm*—Watson, Cole, Grindle & Watson

[57] ABSTRACT

A copper powder-free friction material which is made by sintering and intended for friction surfaces of couplings or brakes contains powdery and/or granular metallic and non-metallic components, at least 50% by weight of the non-ferrous heavy metal component being brass powder.

8 Claims, No Drawings

FRICTION MATERIAL CONTAINING BRASS POWDERS

BACKGROUND OF THE INVENTION

The present invention relates to a friction material which is made by sintering and which is intended for use on contacting surfaces of couplings or brakes, the friction material containing powdery and/or granular metallic and non-metallic components, at least one of which is a non-ferrous heavy metal.

Friction materials of this kind, which are made by sintering, are known and are used primarily in the construction of motor vehicles, but are used also in general machine construction, in various gears and in braking devices. The known friction materials are made of a copper-based sintered powder. Sintered powders to which are added, in addition to copper as the main component, other metals such as tin, zinc, etc., are known from JP-A-63 109 131, 62 260 030, 61 207 549, 61 067 737, 60 116 751, 58 151 444 and 58 079 073. The metallic components are added in elementary form, i.e., as copper, tin, zinc, etc. Since the sintering does not take place in the molten phase but rather in the "dough-like state," copper is contained in a free form in the sintered friction linings. The sintering temperature for metallic friction linings is about 800° C. whereas the melting temperature of the main component, copper, is 1083° C.

The advanced development in the field of gear mechanisms requires that ever more power is concentrated in less space, a feature that in turn requires that the individual subassemblies be adapted to this increased load. The friction materials and the gear oils used for lubrication are also affected by this. To meet the high requirements, high-alloy oils with special oil additives must be used. The improvement in the gear oil properties has an advantageous effect on the loading capacity, reduction of wear, lifespan, frictional behavior, aging of the oil, noise absorption, reduced use of fuel due to the improved efficiency of the gears, etc. However, it also brings functional drawbacks with respect to the friction elements installed into the gears, in particular when their rubbing surfaces are provided with the prior art sintered friction materials.

Due to the effect of the high-alloy oils on the prior art copper-based friction materials, reaction layers form on the friction materials, adversely affecting their frictional behavior. The drop in the coefficient of friction caused by the layer formation leads to malfunctions. In synchronization devices of motor vehicle gears, the losses of the moment of friction lead, e.g., to a deterioration in the switching quality in connection with unpleasant noises. The chemical reaction of the oil additives with the copper of the sintered friction materials also leads to the decomposition of the lining structure, a feature that causes a significant increase in the wear index. The bonding zones of the metallic lining particles are decomposed on the grain boundaries of the porous lining structure, and the inner lining bond collapses with increasing operating time.

The present invention is based on a desire to improve the prior art friction materials, made by sintering, and their resistance to aggressive oils, and to find a sintered friction material which is provided through powder metallurgy and which exhibits good stability to the effect of aggressively acting oil additives and thus prevents destructive chemical reactions which have a negative impact on the frictional and wear properties of the known friction materials.

SUMMARY OF THE INVENTION

This object is achieved with a friction material of the aforementioned composition wherein at least 50% by weight of the non-ferrous heavy metal component is in the form of brass powders of one or different alloys. The non-ferrous heavy metal components of the friction material according to the invention are thus constructed on a brass basis, so that the friction material contains no free copper powders, as is the case with the known sintered friction materials. Chemical tests of the friction material have shown surprisingly that the alloyed brass powders exhibit a much higher stability to oil additives than the copper powders and there are no negative chemical reactions until a much higher temperature level. This also applies to the primarily critical, so-called EP additives, which are used primarily as oil additives in the highly viscous lubricants for gear boxes and hypoid axle gears. These "extreme pressure" additives conceptualized as wear inhibitors are additives based on phosphorous and sulfur.

The breakdown products resulting from the splitting of the additives at higher temperatures, and thus in particular the hydrogen sulfides ($H_2S$), lead to disadvantageous reactions with the non-ferrous heavy metals of the known sintered materials, where the free copper additives are attacked already at a low temperature level. Such damaging reactions are not possible with the composition of the friction material according to the invention. To avoid alteration of the environment and injury to health during the manufacture and during the application of sintered friction materials, the friction material according to the invention dispenses preferably with the usual lead additives. As the metal component in a pure form, tin and iron alone are used in the friction materials of the invention.

With respect to the sintering technology, sintered friction linings can be manufactured using the friction materials according to the invention both by the known sintered powder scatter process and by the similarly known film process according to the molding technology used there. In practical application tests the superiority of the sintered brass friction linings provided with the friction material according to the invention over the known metallic friction linings has been confirmed.

The inventive friction materials contain 5 to 20% by weight of non-metallic component and 80 to 95% by weight metallic component, the metallic component being provided by 0 to 25% by weight ferrous heavy metals and 75 to 100% by weight non-ferrous heavy metals, at least 50% by weight of the non-ferrous heavy metals being provided by brass powders.

In a preferred embodiment of the invention the non-ferrous heavy metal in the friction material of the invention can be exclusively provided by brass powders. Thus, not only is copper dispensed with but also the addition of other powdery non-ferrous heavy metals.

A preferred friction material consists according to the invention of the fact that the brass powders are made of alloys with 70–90% by weight of copper and 30–10% by weight of zinc. Preferably the brass powders are present in amounts up to 90% by weight of the friction material. With these compositions especially good results were obtained.

In addition to the chemical composition of the friction material according to the invention, it is also important for this material to integrate by means of sinter technology the applied brass powders with the other metallic and non-metallic components into the structure of the friction lining formed by the friction material. In so doing, the functional features affecting the frictional behavior such as porosity, surface roughness, strength and homogeneity of the lining structure must be taken into consideration and optimized. Other factors to be taken into consideration are the sintering temperatures and the sintering times, which must be adjusted to the shape and size of the friction lining powders to be used.

Within the framework of the invention these requirements are met in an advantageous manner in that the grain sizes of the brass powders range from 40 to 200μ and the individual components with the other components are designed in grain size ranges which yield a homogeneous, free-flowing mixture in the compound. In addition, it has been proven to be advantageous if the friction surface exhibits a porosity ranging from 10 to 40% in the final phase.

DETAILED DESCRIPTION OF THE PREFERRED EMBODIMENTS

Two examples of the friction material according to the invention are listed in the following.

Example 1

| Component | % by weight | Grain size (micron) |
| --- | --- | --- |
| Brass powder | at least 80 | 40 to 200 |
| Quartzite | 4 to 6 | less than 160 |
| Aluminum oxide | 0.5 to 1.5 | less than 160 |
| Graphite | 4 to 6 | 40 to 80 |
| Tin | 3.5 to 6.5 | less than 63 |

Example 2

| Component | % by weight | Grain size (micron) |
| --- | --- | --- |
| Brass powder | at least 61 | 40 to 100 |
| Quartzite | 2.5 to 3.5 | less than 100 |
| Auminum oxide | 0.5 to 1.5 | less than 160 |
| Graphite | 4 to 6 | 40 to 80 |
| Tin | 3.5 to 6.5 | less than 63 |
| Iron | 18 to 22 | less than 63 |

In Example 1 the most preferred amounts are 84% brass powder, 5% quartzite, 1% aluminum oxide, 5% graphite and 5% tin. In Example 2 the most preferred amounts are 66% brass powder, 3% quartzite, 1% aluminum oxide, 5% graphite, 5% tin and 20% iron.

Even the particle shape and size of the non-metallic lining components are governed by the respective requirements and by the composition of the friction material, wherein they can even deviate from those of the substances of the known sintered friction materials.

What is claimed is:

1. A friction material which is made by sintering and which is intended for use on contacting surfaces of couplings or brakes that are exposed to oils, said friction material containing powdery and/or granular metallic and non-metallic components, said metallic component being present in an amount of 80 to 95% by weight of said friction material and said non-metallic component being present in an amount of 5 to 20% by weight of said friction material, and wherein said metallic component includes a non-ferrous heavy metal composed of at least 50% by weight brass powders and no free copper, said brass powders consisting of 70-90% by weight of copper and 30-10% by weight zinc.

2. A friction material as claimed in claim 1, wherein said metallic component comprises 0 to 25% by weight ferrous heavy metals and 75 to 100% by weight non-ferrous heavy metals.

3. A friction material as claimed in claim 2, wherein the non-ferrous heavy metals are composed exclusively of brass powders.

4. A friction material as claimed in claim 1, wherein the brass powder content amounts up to 90% by weight of the friction material.

5. A friction material as claimed in claim 1, wherein the grain sizes of the brass powders range from 40 to 200μ and the the friction material is in the form of a free-flowing, homogenous mixture.

6. A friction surface formed from the friction material of claim 1 and having a porosity ranging from 10 to 40%.

7. A powdery and/or granular friction material which is made by sintering and which is intended for use on contacting couplings or brakes that are exposed to oils, said friction material containing at least 80 wt. % brass powder, 4 to 6 wt. % quartzite, 0.5 to 1.5 wt. % aluminum oxide, 4 to 6 wt. % graphite and 3.5 to 6.5 wt. % tin.

8. A powdery and/or granular friction material which is made by sintering and which intended for use on contacting couplings or brakes that are exposed to oils, said friction material containing at least 61 wt. % brass powder, 2.5 to 3.5 wt. % quartzite, 0.5 to 1.5 wt. % aluminum oxide, 4 to 6 wt. % graphite, 3.5 to 6.5 wt. % tin and 18 to 22 wt. % iron.

* * * * *